United States Patent [19]

Byham

[11] Patent Number: 4,502,540
[45] Date of Patent: Mar. 5, 1985

[54] TERTIARY OIL RECOVERY

[75] Inventor: Don E. Byham, Glenolden, Pa.

[73] Assignee: Mobil Oil Corporation, New York, N.Y.

[21] Appl. No.: 463,699

[22] Filed: Feb. 4, 1983

Related U.S. Application Data

[63] Continuation-in-part of Ser. No. 269,124, Jun. 1, 1981, abandoned.

[51] Int. Cl.$^3$ .............................................. E21B 43/22
[52] U.S. Cl. ................................ 166/274; 252/8.55 D
[58] Field of Search ................... 252/8.55 D; 166/274, 166/275

[56] References Cited

U.S. PATENT DOCUMENTS

| | | | |
|---|---|---|---|
| 3,373,809 | 3/1968 | Cooke, Jr. | 166/273 |
| 3,536,136 | 10/1970 | Jones | 252/8.55 X |
| 4,125,156 | 11/1978 | Glinsmann | 166/274 X |
| 4,193,452 | 3/1980 | Wilson et al. | 252/8.55 X |
| 4,216,097 | 8/1980 | Stournas | 252/8.55 |
| 4,404,109 | 9/1983 | Tellier et al. | 252/8.55 R |

FOREIGN PATENT DOCUMENTS

| | | | |
|---|---|---|---|
| 2396866 | 2/1979 | France | 252/8.55 |
| WO80/00921 | 5/1980 | PCT Int'l Appl. | |
| 2001377 | 1/1979 | United Kingdom . | |

*Primary Examiner*—Herbert B. Guynn
*Attorney, Agent, or Firm*—Alexander J. McKillop; Michael G. Gilman; Charles J. Speciale

[57] ABSTRACT

An improved method for the recovery of tertiary oil from oil formations containing connate waters having a high brine concentration. A stable alcohol external microemulsion is formed from specific brine-soluble surfactants and alcohols for employment as a chemical slug. Such a microemulsion may be used to efficiently and effectively recover tertiary oil from formations in high brine concentrations. Specific examples of surfactants which may be employed to form the microemulsions of the present invention include amphoteric surfactants such as bis-2-hydroxyethylcocoamine propane sulfonate and bis-2-hydroxyethyloctadecyl amine propane sulfonate.

9 Claims, No Drawings

TERTIARY OIL RECOVERY

CROSS-REFERENCE TO RELATED APPLICATION

This application is a continuation-in-part of copending U.S. application Ser. No. 269,124, filed June 1, 1981, now abandoned.

BACKGROUND OF THE INVENTION

1. Field of the Invention

The present invention relates to an improved method for oil recovery from wells characterized by having high brine concentrations. The invention comprises the injection of microemulsions of specific surfactants which have been found to result in effective and efficient oil recovery.

2. Description of the Prior Art

The present invention relates to the displacement of oil from the pores of subterranean, oil-containing reservoirs, and more particularly to special surface active systems to be used with "waterflooding" techniques to improve the oil displacement efficiency of waterfloods.

Knowledge is wide spread in the oil industry that the so-called "primary recovery" techniques, which include natural flow, gas lifting, gas repressurization and pumping methods, leave substantial quantities of oil in oil-bearing reservoirs. In addition, there are oil-bearing reservoirs, which even though containing large quantities of oil, are incapable of being produced by primary recovery techniques. Recognition of the large amount of residual oil in many oil-producing reservoirs has led to the use of the so-called "secondary recovery" techniques which have as their primary purpose the economical recovery of additional quantities of the residual oil known to be present in the reservoir.

Probably, one of the more common secondary recovery techniques is the so-called "waterflooding" method in which aqueous fluids are injected at one point in the reservoir at pressures sufficient to be forced out into the reservoir and toward a spaced production well or wells, thereby, in effect, displacing it from the pores of the reservoir and driving the oil ahead of the water front.

However, waterflooding is only advantageous when the cost of injecting water and necessary chemical modifiers is less than the value of the oil recovered. Therefore, the displacement efficiency of waterfloods has been the determining factor of whether such a technique will be used.

Generally, the difficulty with waterfloods is that the small pores and capillaries of the reservoir contain hydrocarbons (oil and/or oil and gas) which are generally water immiscible. The existence of high interfacial tensions between the boundary of the water and hydrocarbons seriously impedes the ability of the water to displace oil trapped in the reservoir by capillarity.

Since in many oil reservoirs the oil tends to be trapped within the pores of the rock formations by capillarity, merely forcing water therethrough will not displace much of this trapped oil. However, a reduction in the interfacial tension between the water and the oil will tend to increase the amount of oil that will be displaced by the water. Thus, various aqueous surfactant systems have been proposed for use in waterflooding processes for recovering oil. Surfactants which have been used in the prior art include various nonionic, cationic, and anionic surfactants. Examples of such prior art surfactants include sodium glyceryl monolaurate sulfate, dihexyl sodium succinate, hexadecylnaphthalene sulfonate, diethyleneglycol sulfate, glycerol disulfoacetate monomyristate, p-toluidene sulfate laurate, p-chloroaniline sulfate laurate, sodium sulfato oleylethylanilide, triethanolamine myristate, N-methyltaurine oleamide, pentaerythritol monostearate, polyglycerol mono-laurate, triethanolamine oleate, morpholine stearate, hexadecyl trimethylammonium chloride, ditetradecyl dimethyl ammonium chloride, n-dodecyl-diethyleneglycol sulfate, monobutylphenyl phenol sodium sulfate, and triethanolamine laurate or triethanolamine oleate.

It has been found that the solubilization of oil in aqueous solutions can occur, to an appreciable extent, in an aqueous solution of a surface-active chemical, whenever micelles are formed. But the amount of oil solubilized by a surfactant solution is usually small, because the micelles are very small, comprising about 70 molecules of surfactant, for example. In most instances, an increased concentration of surfactant is ineffective to increase the size of individual micelles. Thus, increased concentrations of surface-active agents are usually ineffective to improve the efficiency with which residual oil is displaced from a porous reservoir.

Under certain conditions, however, with selected surfactants, the micelles can be caused to grow to much larger dimensions, with a consequent increase in the amount of oil solubilized by a given amount of detergent. These systems, which include usually large micelles and large amounts of solubilized oil and aqueous medium, are transparent and are known as microemulsions. It has now been found that specific surface-active agents capable of forming a microemulsion with oil have an unusually high displacement efficiency in the recovery of reservoir oil.

With few exceptions, the formation of a microemulsion requires the presence of an organic polar material such as an alcohol, for example. It has been known in the prior art to displace reservoir oil with a bank of an oil-miscible liquid, for example with alcohol alone, whereby a true molecular solution of the reservoir oil is formed. The microemulsion-forming solutions of the present invention are as effective as alcohol alone in their ability to recover oil, while possessing the distinct advantage of being far less expensive. Frequently, the solutions of the present invention are even more effective than an oil-miscible solvent, for example, an alcohol bank injected by itself, because relatively small volumes of connate water are sufficient to cause a separation of phases when flooding with an alcohol alone (or alcohol solutions of prior art surfactants) whereas the solutions of the present invention retain their oil-miscible character dispite substantial dilution by connate water or brine. However, even should the emulsion break, the resulting mixture will recover the crude.

Applications of the aforedescribed microemulsion compositions of the past have been generally satisfactory when employed in reservoirs of low salinity or, alternatively, reservoirs which may be preflushed with water prior to surfactant injection in order to lower the salinity of the reservoir. Such preflushing to lower salinity levels is difficult and very expensive. Typically such high salinity reservoirs have salinity levels on the order of about 4 to about 5% and sometimes above. At such brine concentrations, the typical prior art microemulsions of surfactants which are employed result in the surfactants precipitating out, rendering the injection of the chemical slug ineffective. There are many reservoirs of such high salinity levels from which tertiary oil cannot be recovered utilizing prior art techniques. It is the purpose of the present invention to provide a method whereby tertiary oil may be recovered efficiently and effectively from such high salinity level reservoir fields, without the necessity of employing a preflush operation.

SUMMARY OF THE INVENTION

It has been found in accordance with the present invention that a stable microemulsion may be formed from a special brine-soluble surfactant and alcohol using saline field water. Such a microemulsion may be employed to recover tertiary oil effectively from formations located in high brine concentration reservoirs directly. The oil recovery may be further enhanced by employment of mobility control agents.

The chemical slug employed in the method of the present invention, for oil recovery of highly saline reservoir deposits, comprises a surfactant, an alcohol and brine. Specific examples of suitable surfactants which may be employed include amphoteric surfactants such as bis-2-hydroxyethylcocoamine propane sulfonate and bis-2-hydroxyethyl-octadecyl amine propane sulfonate. Suitable alcohols have been found to be those containing from about 5 up to about 10 carbon atoms and in any steric arrangement. Hexanol has been found to be a particularly preferred alcohol.

It has been found that in order to make a stable microemulsion in accordance with the present invention, that the more important factors for consideration are the chemical composition of the microemulsion and the preparation procedure. The ratio of surfactant to alcohol may be approximately 1.5 or below in terms of weight of surfactant in grams to volume of alcohol in milliliters. However, higher ratios may be employed depending upon the salinity of the brine and provided that the microemulsion is alcohol external. At lower ratios, more hexanol will be needed but the emulsion remains stable because it is a surfactant in hexanol system, i.e. hexanol is the external phase. The brine concentration should be at least about 5% and preferably about 10%. This brine concentration may range up to about 30% and above. If the brine concentration is less than about 5%, some surfactants may not form a suitable stable microemulsion. However, certain surfactants will form the microemulsion in brine lower than 5%, as long as some divalent ions are present. An example is dimethylcocoammonio propane sulfonate. The ratio of surfactant to brine is on the order of about 0.5 or lower. If excess brine is employed, it separates into two phases. The water rich phase may be recycled for making up more emulsion by adding additional surfactant and alcohol or it may be alternatively employed as a portion of the drive fluid. The emulsion may be formed by dissolving the required amount of surfactant in the brine. The alcohol is subsequently added slowly to the solution with stirring. A creamy mixture is produced. When sufficient alcohol has been added, the mixture turns clear, viscous and light yellow in color. If excess water is employed, the emulsion will separate at this point.

An alternate procedure which may be employed comprises grinding the surfactant to very small particles on the order of about 100 mesh and subsequently mixing the surfactant with the alcohol. The mixture is subsequently heated gently with stirring to about 100° F. and the brine is subsequently added. Again, a creamy product is formed which turns into a clear yellow microemulsion when sufficient brine is added. This microemulsion will not form when distilled or deionized water is used.

The alcohol external microemulsion is liquid, flowable, transparent, clear, non-opalescent, stable and capable of being centrifuged at high speeds, e.g., 5000 rpm or higher, at normal centrifuge radii without separating. Particle, micelle or droplet size is sufficiently small to be incapable of defracting light, e.g., from about 100 to about 600 Å.

The microemulsion described hereinabove may be injected into the formation at a slug size of about 0.05 up to about 0.1 pore volume followed with formation water pushing to produce the tertiary oil. The injected slug size may generally range from about 0.01 up to about 1.0 pore volume but a particularly preferred slug size is in the range of from about 0.05 up to about 0.1 pore volume.

Surfactants which may be employed to form the microemulsions of the present invention may be represented by the following structural formula:

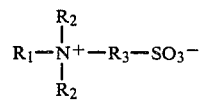

wherein $R_1$ is an alkyl group containing from about 8 to about 20 carbon atoms; $R_2$ comprises a lower alkyl or hydroxy substituted lower alkyl group; and $R_3$ is an alkyl group containing up to about 4 carbon atoms. Specific examples of such surfactants include Bis-2-Hydroxyethylcocoamine propane sulfonate and Bis-2-Hydroxyethyloctadecyl amine propane sulfonate, and may also include dimethyloctadecyl ammonio propane sulfonate, dimethylsoya ammonio propane sulfonate, and dimethylcoco ammonio methyl sulfonate.

The microemulsions of the present invention preferably consist essentially of the brine, surfactant and alcohol constituents described herein. However, various further additives are possible, provided that the microemulsion remains a flowable, transparent liquid. It is especially noted that the microemulsions of the present invention are preferably essentially free of hydrocarbon additives, such as those described in the United Kingdom Published patent application GB No. 2,001,377A (e.g., especially dodecane and the like).

DESCRIPTION OF SPECIFIC EMBODIMENTS

Recovery of oil by chemical flooding from high brine reservoirs is extremely difficult. The difficulty increases with the increase in reservoir salinity and with the decrease in reservoir permeability. The Low Tension Water Flood Process, when applied to very high salinity reservoirs, such as Mobil's West Burkburnett, needs substantial modifications to recover oil successfully. It is known to be difficult to reduce the salinity of the reservoirs by preflush with low salinity water to the levels that the petroleum sulfonate type surfactants and the polysaccharide mobility control agent can function as designed. The loss of petroleum sulfonate type surfactants by precipitation with the divalent and multivalent cations or by adsorption onto the reservoir rocks is a serious and costly problem. When brine tolerant surfactants, such as alkylarylpoly(ethoxy)alkane sulfonates, are used under high salinity conditions, two serious problems arise: (1) Forbiddingly high adsorption loss and (2) frequent formation of brine-oil emulsion resulting in high pressure development. In addition to the above problems associated with the surfactants, the loss of polysaccharide mobility control agent and the plugging of the reservoir rocks by gelation and filtration presents another serious problem. We have now discovered certain formulations which reduce all the above problems.

The present invention may be carried out utilizing injection and production systems as defined by any suitable arrangement of wells. One well arrangement commonly used in waterflooding operations and suitable for use in carrying out the present invention is an integrated five-spot pattern of the type illustrated in U.S. Pat. No. 3,927,716 to Burdyn et al. Other well arrangements may be used in carrying out the present invention, examples of which are set forth in the Burdyn et al patent. By the term "pore volume" as used herein is meant that volume of the portion of the formation underlying the well pattern employed, as described in greater detail in the Burdyn et al patent.

The drive fluid may comprise water, preferably field brine, optionally containing appropriate additives.

The present invention may be carried out in conjunction with the use of a thickening agent, particularly in the drive fluid, added for mobility control purposes. Such mobility control slug normally will be injected immediately after the slug containing microemulsion of the present invention. The thickening agent may be added in concentrations so as to provide a graded viscosity at the trailing edge of the mobility control slug as disclosed in the aforementioned paper by Foster or graded viscosities at both the leading and trailing edges of the mobility control slug as disclosed in U.S. Pat. No. 4,018,281 to Chang. Alternatively, the thickening agent concentration may be relatively constant throughout. Normally, the viscosity of at least a portion of the mobility control slug should be at least as great as that of the reservoir oil and typically it will be within the range of about 1 to 4 times the viscosity of the reservoir oil. Various thickening agents which may be employed for mobility control purposes are well known to those skilled in the art and include such polymers as biopolymers and the various partially hydrolyzed polyacrylamides available from the Dow Chemical Company under the tradename "Pusher" chemicals.

An outstanding feature of the present surfactant systems as compared to most other brine-tolerant surfactants is that there is no pressure development during the oil recovery, making them especially suitable for reservoirs of low permeability, such as Mobil's West Burkburnett. The laboratory oil displacement tests were carried out employing 6-foot long flow tubes having an inside diameter of about ¼ inch. In each tube run, the tube was packed with unconsolidated Berea sand and then saturated with saline water. The crude oil was then flooded into the tube until the effluent from the tube contained no water, with the total amount of water being displaced from the tube during this operation being measured to determine the initial oil saturation. Each tube was then subjected to a simulated waterflood by injecting a brine in an amount as necessary until the effluent was free of oil. The amount of oil produced during this operation was measured in order to determine the residual oil saturation after waterflood of the tube. A simulated surfactant waterflood was then carried out by injecting an aqueous surfactant slug followed by the injection of a driving fluid until the effluent from the tube was free of oil. The amount of oil recovered during this operation was measured in order to arrive at the final residual oil saturation and the amount of tertiary oil recovered. Except as noted hereinafter, the water used in the initial water saturation step, the simulated waterflood, the surfactant slug and the drive fluid was brine containing 13.2 wt. % NaCl, 3.47 wt. % $CaCl_2 \cdot 2H_2O$ and 1.53 wt. % $MgCl_2 \cdot 6H_2O$.

Having described the present invention in broad, general terms, the following will illustrate specific aspects of the development. They are meant to illustrate the invention only, not to limit it. All the Examples below employed West Burkburnett-produced oil and synthetic West Burkburnett brine, which contained the concentrations of salts disclosed in the paragraph next above. To simulate all types of reservoirs, brine wet, oil wet and aged brine wet Berea sandpack 6' columns were used, as follows:

1. Brine wet column—The column was packed with dry Berea sand, evacuated and filled with brine to determine the pore volume, oil-flooded until no more brine was produced and brine-flooded until no more oil was produced to determine the amount of residual oil;

2. Oil wet column—The column was packed with Berea sand, dried at 90° C. and 1 mm Hg pressure for more than four hours. The column was evacuated, filled with oil to determine the pore volume and brine-flooded until no more oil was produced to determine the amount of residual oil.

3. Aged brine wet column—The column was packed with dry Berea sand, evacuated and filled with brine to determine the pore volume and oil-flooded until no more brine was produced. The column was then capped at both ends and aged for a period of time (e.g., 5 to 6 months). Then the column was brine-flooded until no more oil was produced to determine the amount of residue oil.

EXAMPLE 1

A brine wet column as aforedescribed was flooded with 0.085 pore volume of a microemulsion comprising about 2 grams of bis-2-hydroxyethylcocoamine propane sulfonate; 1 milliliter of hexanol; and 4.5 milliliters of 16.6% brine described as hereinbefore set forth was injected and pushed with about 4.0 pore volume of a simulated West Burkburnett 16.6% brine solution. The oil recovery was found to be about 78%. No pressure build up was observed. This clearly demonstrates the fact that the microemulsion is extremely effective for employment in tertiary oil recovery.

EXAMPLE 2

The foregoing example was repeated except for the fact that in this example a mobility control agent was employed. The mobility control agent employed was a solution of 500 ppm Keltrol in 1% sodium chloride. Keltrol is a commercially available polysaccharide biopolymer. The oil recovery was found to be about 90%. Again, this example demonstrates that the oil recovery rate in accordance with the present invention is not only highly efficient but may be improved by the employment of mobility control agents.

EXAMPLE 3

This run was the same as Example 2 with the exception that a different surfactant, bis-2-hydroxyethyloctadecyl amine propane sulfonate, was employed to form the microemulsion. The oil recovery exceeded 90%.

What is claimed is:

1. A method for recovering oil from a formation by injecting a slug of an alcohol external microemulsion followed by a drive fluid, said slug and drive fluid being injected into an injection means in operative connection with a recovery means, whereby oil is recovered from said recovery means, said alcohol external microemulsion consisting essentially of:
(i) an amphoteric surfactant of the formula

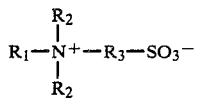

wherein $R_1$ is an alkyl group containing from about 8 up to about 20 carbon atoms; $R_2$ comprises a lower alkyl or hydroxysubstituted lower alkyl group; and $R_3$ is an alkyl group having up to 4 carbon atoms;
(ii) an alcohol containing from about 5 up to about 10 carbon atoms; and
(iii) brine, wherein said microemulsion is essentially free of hydrocarbon additives, said surfactant and said brine constituting the internal phase of said microemulsion, the amount of said slug being that which is sufficient to increase the amount of oil removed from said formation by the injection of said drive fluid.

2. A method in accordance with claim 1 wherein said alcohol is hexanol.

3. A method in accordance with claim 1 wherein said surfactant is bis-2-hydroxyethylcocamine propane sulfonate.

4. A method in accordance with claim 1 wherein said surfactant is bis-2-hydroxy-ethyloctadecyl amine propane sulfonate.

5. A method in accordance with claim 1 wherein said surfactant is dimethyloctadecyl amine propane sulfonate.

6. A method in accordance with claim 1 wherein said surfactant is dimethyl soya amine propane sulfonate.

7. A method in accordance with claim 1 wherein said surfactant is dimethylcocamine methyl sulfonate.

8. A method in accordance with claim 1 wherein said drive fluid comprises a mobility control agent.

9. A method in accordance with claim 1 wherein the ratio of said surfactant to said alcohol is approximately 1.5 or below in terms of grams of surfactant to milliliters of alcohol.

* * * * *